United States Patent

[11] 3,532,103

| [72] | Inventors | Rudolph E. Herrstrum; Vernon W. Pearson, Rockford, Illinois |
|---|---|---|
| [21] | Appl. No. | 723,371 |
| [22] | Filed | April 23, 1968 |
| [45] | Patented | Oct. 6, 1970 |
| [73] | Assignee | By mesne assignments to Greenlee Bros. & Co., Rockford, Ill., a corporation of Delaware |

[54] REVERSING OR FOUR-WAY VALVE
11 Claims, 4 Drawing Figs.

[52] U.S. Cl. .................................................... 137/106, 137/596.1, 137/596.2
[51] Int. Cl. .................................................... G05d 7/00
[50] Field of Search........................................... 137/106, 596.1, 596.2, 119(Lastz)

[56] References Cited
UNITED STATES PATENTS

| 882,045 | 3/1908 | Astfalck.................. | 137/596.2X |
| 2,393,805 | 1/1946 | Parker..................... | 137/596.2 |
| 2,508,181 | 5/1950 | May........................ | 137/596.1X |
| 2,982,302 | 5/1961 | Winkler.................... | 137/596.1 |
| 3,051,188 | 8/1962 | Tilney..................... | 137/119 |

Primary Examiner—Clarence R. Gordon
Assistant Examiner—David J. Zobkiw
Attorney—Hofgren, Wegner, Allen, Stellman and McCord ABSTRACT: A four-way valve in which the valve elements for controlling the flow of fluid are in the form of four ball valves, including two pilot operated exhaust valves and two outlet check valves operable either by fluid pressure in the inlet side thereof or by the pilot, with operation of the valve elements being accomplished by a pair of rotary control shafts which have screw threaded mountings in the valve casing reversibly rotated by a common manual control handle movable to forward position closing one of the exhaust valves which effects flow through the associated check valve and opening the other exhaust and check valves permitting return flow across this check valve, a reverse position where the opposite occurs, a neutral position opening all the valves to provide an open center function, and intermediate locking positions between forward-reverse and neutral opening all valves except one of the check valves thereby preventing reverse flow across that check valve.

Patented Oct. 6, 1970
3,532,103
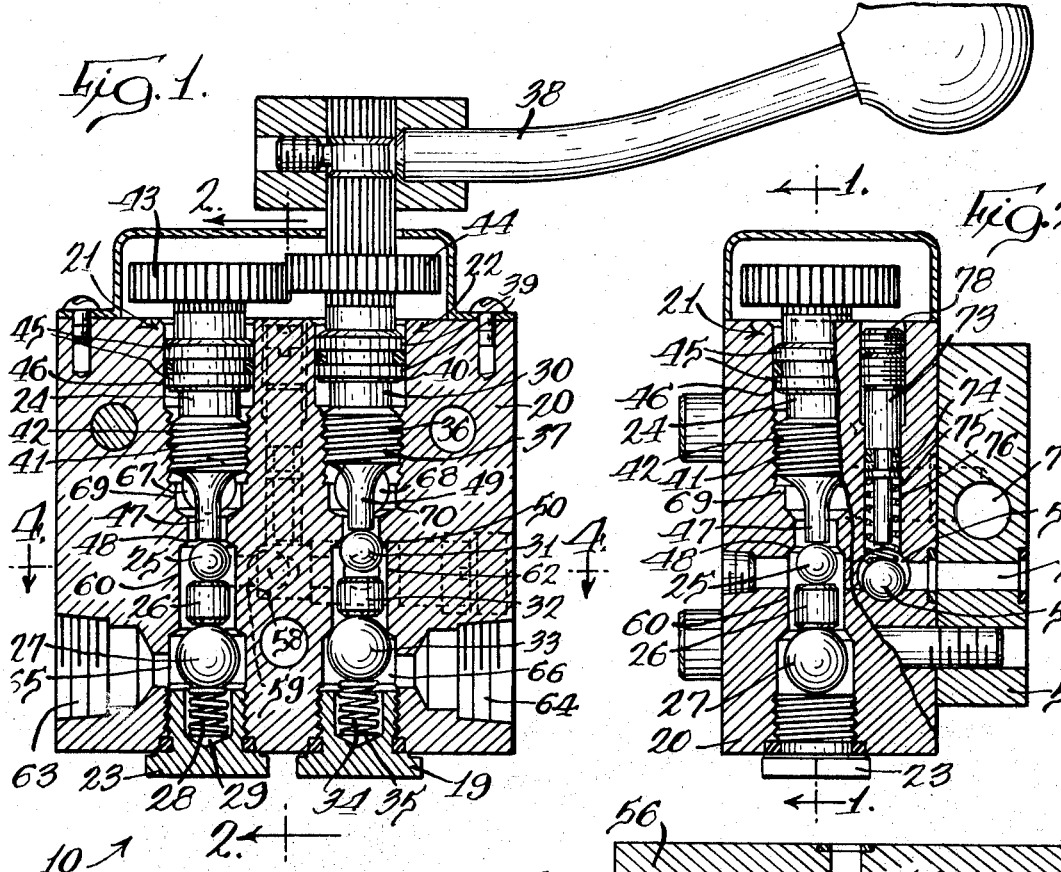

3,532,103

REVERSING OR FOUR-WAY VALVE

BACKGROUND OF THE INVENTION

This invention relates generally to reversing valves and more particularly to a four-way valve controlling communication between supply and exhaust passages and two outlet ports. Valves of this general character are used for example to control the supply of fluid to a double acting piston and cylinder device. With one of the valve outlets connected to one side of the cylinder and the other outlet connected to the other side, movement of the piston in either direction is effected by selectively connecting the inlet port with one of the outlet ports.

In the past spool valves have been provided for this purpose but they have been found to leak excessively when subjected to high pressure. The present valve construction also serves the function of preventing, when desired, the flow of fluid from either side of the cylinder thereby locking the piston from movement in one direction. To prevent load creepage it is important that the valve construction not leak under these conditions. The present multiple ball valve arrangement eliminates this problem.

SUMMARY OF THE INVENTION

In accordance with the present invention, a four-way valve is provided with a single manual control movable from a "neutral" open center position to "forward" or "reverse" positions on either side of "neutral" and also movable to intermediate ("hold") positions between "neutral" and "forward" and between "neutral" and "reverse" where return flow through one of the outlet ports is prevented so that if the valve were connected to a piston and cylinder device, movement of the piston would be prevented. The valve consists of two ball check valves and two exhaust ball valves operated by threaded pilot members one associated with each of the outlet ports. Movement of the valves is effected by simultaneously rotating the pilot members in opposite directions by a single control handle geared to the pilot members. A selectively operable inlet ball valve automatically controls flow to one or the other outlet port.

BRIEF DESCRIPTION OF THE DRAWING

FIG. 1 is a section through a preferred form of the invention, approximately along the line 1—1 of FIGS. 2 and 3;
FIG. 2 is a section along line 2—2 of FIG. 1;
FIG. 3 is a plan view; and
FIG. 4 is a section along line 4—4 of FIG. 1.

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

DESCRIPTION OF THE PREFERRED EMBODIMENT

As shown in the drawing, a four-way valve 10 is provided including a valve casing 20 which has a pair of vertically arranged parallel stepped bores 21 and 22 provided with closure plugs 23 and 19, respectively, at their lower ends. In bore 21 are arranged in descending order, a valve control shaft 24, an exhaust ball valve 25, a cylindrical spacer 26, a check ball valve 27 and a spring 28, the latter seated in a recess 29 in the plug 23. Similarly, in bore 22, are arranged in descending order, a valve control shaft 30, an exhaust ball valve 31, a cylindrical spacer 32, a check ball valve 33 and a spring 34, the latter seated in a recess 35 in the plug 24.

The control shafts 24 and 30 are rotatably supported in the stepped bores by means of screw threaded portions 41 and 36 which engage corresponding screw threads 42 and 37, respectively, in the casing. The upper end of the control shaft 30 carries an operating handle 38.

The upper end of the control shaft 24 carries a gear 43 meshing with a similar gear 44 on the shaft 30 so that upon operator movement of handle 38 the control shafts will be reversely rotating, moving axially in opposite directions in their associated bores 21 and 22. O-ring type seals are fitted between rings 45 and 39 provided on the shafts 24 and 30, respectively, for sealing the shafts against the adjacent portions 46 and 40 of the stepped bores.

The lower ends of the control shafts are of reduced diameter and define pilots 47 and 49 adapted to engage the ball valves 25 and 31, respectively, to move them downwardly from their adjacent seats 48 and 50 against the force of the springs 28 and 34 acting through the intermediate valves 27 and 33 and spacers 26, 32.

A fluid supply port 55 extends through a plate 56 fixed on the casing 20 and through the casing to a cylindrical chamber 57 containing an inlet ball valve 58. A passage 59 leads from one end of the chamber to the portion 60 of the stepped bore 21 and a passage 61 leads from the other end of the chamber 57 to the corresponding portion 62 of the stepped bore 22. Chamber 57 and passage 61 are partly defined by a removable plug 57a permitting access to valve 58.

Outlet ports 63 and 64 extend laterally from the lower portions 65 and 66 respectively of the stepped bores 21 and 22 and are adapted to be connected to a reversible load device such as a hydraulic motor, a double acting piston and cylinder device, or the like. Exhaust ports 67 and 68 lead from upper portions 69 and 70 of the stepped bores 21 and 22 respectively to a common return passage 71 having an outlet 72 for connection to a return line leading to the pressure supply source.

The inlet valve 58 in the chamber 57 is adapted to move to the position shown in FIGS. 1 and 4 when a higher pressure exists in bore portion 62 than in bore portion 60, thereby directing inlet fluid through passage 61 to the portion 62 of the stepped bore 22, and is adapted to move to the right-hand end of the chamber 57, to close the passage 61 and open the passage 59 when the pressure in bore portion 60 is higher than in bore portion 62. To aid in the operation of the valve 58 and to assure movement of the valve to a central position when pressure in both bore portions 60 and 62 is the same, a coiled centering spring 75 (FIG. 2) is located on the reduced end of an adjustable stem 73 in a bore 76 directly above the center of chamber 57 as viewed in FIG. 1. The free end of the spring engages the valve ball 58 so as to continuously urge it toward center. The spring yields laterally from a central position when the valve is moved from a centered position in chamber 57. Threaded stem 73 may be adjusted to provide the correct force on ball 58 to urge it toward center and yet let it yield to opposite sides. The stem is sealed by ring 74 and may be retained in place by locking screw 78.

With handle 38 in the reverse position shown in the drawing pilot 47 is in its lowermost position and pilot 49 is in its uppermost position. In its lowermost position, pilot 47 holds exhaust valve 25 a maximum distance from its seat 48, and through spacer 26 holds check valve 27 away from its seat thereby permitting free communication between port 63 and the low pressure return passage 71. In its uppermost position, pilot 49 permits exhaust valve 31 to close and permits spring 34 to close check valve 33 (absent high pressure in bore portion 62). With inlet 55 connected to a pump (not shown) supply fluid passes from the inlet port 55, through chamber 57 to the right of valve 58, and through port 61 to the portion 62 of the stepped bore 22 below the valve 31. Since the end 49 of the control shaft 30 is in its uppermost position, the fluid under pressure in bore portion 62 moves valve 31 to its seated position preventing the passage of fluid to the tank through port 68. The build up of pressure in bore portion 62 causes inlet valve 58 to shift to its left position blocking the flow of supply fluid to bore portion 60. With bore portion 62 pressurized valve 33 opens against the opposing force of spring 34 passing fluid to the cylinder port 64. At the same time, since the valves 25 and 27 are held in their open positions reverse flow in port 63 is permitted and fluid flows upwardly in the stepped bore 21 past the valves 27 and 25 and into the tank port 67.

Movement of the handle 38 from the "reverse" position shown in FIGS. 1 and 3 through 180° to the "forward" position indicated in FIG. 3; lowers the control shaft 30 from its uppermost position shown in FIG. 1 to its lowermost position (corresponding to that shown for the control shaft 24) and raises control shaft 24 from its lowermost position shown to its uppermost position (corresponding to that shown for control shaft 30). This reverses the position of the valves shown in FIG. 1 so that valves 31 and 33 are held open by pilot 49 and valves 25 and 27 are permitted to close. The gearing 43, 44 between the control shafts, is arranged to effect this reversal of valve positions in 180° of movement of the handle 38. Inlet fluid in chamber 57 forces valve 58 to the right end of the chamber because of the low pressure in bore portion 62. Fluid pressure is directed to bore portion 60 causing check valve 27 to open porting high pressure fluid from outlet port 63. Return flow entering port 64 passes to return line 71 through bore 62 and exhaust port 68.

Movement of the control handle 38 to the neutral position indicated in FIG. 3 (from the reverse position shown) lowers the control shaft 30 from the position shown in FIG. 1 and raises the control shaft 24 so that the pilots 49 and 47 respectively of the control shafts would be at a common level, between their uppermost and lowermost positions, unseating the valve 31 and maintaining the valve 25 open. The spacers 26 and 32 are sized so that in neutral the check valves 27 and 33 will be held open although not as far open as valve 27 is in FIG. 1. Fluid supplied through the port 55 then passes through both of the passages 59 and 61 (the valve 58 being returned to a central position in the chamber 57 by the spring 75) and past the valves 25 and 31 to the return passages 67 and 68. The valves 27 and 33, since they are also partly open, permit communication between both ports 63 and 64 and the return line 71. This characterizes the valve 10 as being of the open center type. Thus, for example, a double acting piston and cylinder device connected to said ports would have its piston subjected to equal low pressure on both sides and therefore would not be locked against movement by an external load.

With the movement of the control lever 38, to the "reverse hold" position indicated in FIG. 3, the control shaft 30 moves downwardly sufficiently to unseat the valve 31 but not enough to open check valve 33 (because of the clearance between the spacers and the valves when they are seated).

At the same time control shaft 24 moves upwardly from its position shown in FIG. 1, but not as far as the control shaft 30, so that both valves 25 and 27 continue to be held open by pilot 47 although not as far open. Since chamber 57 is at low pressure, check valve 33 will close preventing the reverse flow of fluid in port 64. For example if one end of the cylinder of a piston and cylinder device were connected to port 64 the piston would be locked from movement toward that end.

With movement of the control lever 38 from the forward position described above, the valves assume positions reversed from the "reverse hold" position described above so that control shaft 24 moves downwardly sufficiently (from the forward position of the valve 10) to unseat the valve 25 but not enough to open the check valve 27 (because of the clearance between the spacers and the valves when they are seated). At the same time control shaft 30 moves upwardly from forward position described above, but not as far as the control shaft 24, so that both valves 31 and 33 continue to be held open by pilot 49 although not as far as they were in the forward position. Since chamber 57 is at low pressure, check valve 27 will close preventing the reverse flow of fluid in port 63. If the other end of the piston and cylinder device were connected to port 63 the piston would be locked against movement toward that end. Thus, a dead load connected to the piston and cylinder device would be held from movement in the hold positions of the valve.

It is thus seen that the present valve when placed in its forward position will provide flow through one outlet, when placed in its reverse position will provide flow from the other outlet, when placed in its neutral position will communicate both of the outlets with a low pressure return and when placed in one of the intermediate hold positions will block reverse flow in one of the outlets to provide a holding function.

We claim:

1. A reversing valve having in combination, a casing having a pair of valve chambers, a pair of exhaust ports leading therefrom, a pair of fluid supply ports leading thereto, a pair of outlet ports leading therefrom, a first pair of valves in said valve chambers controlling the flow of fluid from the chambers into the exhaust ports, a pair of check valves for selectively blocking flow from the outlet ports which open under fluid pressure in said chambers to permit the flow of fluid from the chambers into the outlet ports and when seated, prevent return flow therefrom, a common control means including a manually operable member for selectively operating all of said valves, and means for directing fluid from a supply passage alternately through said supply ports to one valve chamber or the other.

2. A reversing valve as defined in claim 1 wherein the casing has parallel bores, portions of which form the valve chambers, the exhaust ports lead from one end of the chambers, the outlet ports lead from the other ends of the chambers, and the supply ports lead to mid-portions of the chambers.

3. A valve as defined in claim 1 wherein there is a chamber between the supply ports having an inlet passage connected to said supply passage and outlets to the supply ports, and an inlet valve operable in said chamber between the supply ports and movable to close one or the other of the outlets to the supply ports.

4. A reversing valve as defined in claim 3 including means for biasing said inlet valve towards a center position permitting flow to both of said supply ports.

5. A reversing valve as defined in claim 1 wherein said common control means is movable to a neutral position opening said first pair of valves and opening said check valves permitting free communication of said outlet ports and said supply passage with said exhaust ports.

6. A reversing valve as defined in claim 1 wherein said manually operable member is movable, said manually operable member being movable to at least one locking position, said inlet ports opening between said first pair of valves and said check valves in the respective chambers, said manually operable member in said locking position opening one of said first pair of valves and permitting closure of the check valve associated with the same chamber to block flow from the outlet port associated with the associated check valve.

7. A reversing valve having in combination, a casing having a pair of valve chambers, a pair of exhaust ports leading therefrom, a pair of fluid supply ports leading thereto, a pair of outlet ports leading therefrom, a first pair of valves in said valve chambers controlling the flow of fluid from the chambers into the exhaust ports, a pair of check valves which open to permit the flow of fluid from the chambers into the outlet ports and when seated, prevent return flow therefrom, a common control means including a manually operable member for selectively operating said valves, means for directing fluid from a supply passage alternately through said supply ports to one valve chamber or the other, the first valves and the check valves move in a common direction axially of the bores to close and in the opposite direction to open, each of said first valves and said check valves having seats, a spacing element in each bore between the valves in that bore and having a clearance therewith when both valves in the bore are seated, and springs urging the check valves towards their seated positions, said common control means includes a stem in each bore and having a screw threaded mounting therein and means for operating said valve stems simultaneously in opposite directions.

8. A reversing valve as defined in claim 7 wherein the means for operating the valve stems includes interengaging gears secured to the stems.

9. A reversing valve having in combination, a casing having a pair of valve chambers, a pair of exhaust ports leading therefrom, a pair of fluid supply ports leading thereto, a pair of outlet ports leading therefrom, a first pair of valves in said valve chambers controlling the flow of fluid from the chambers into the exhaust ports, a pair of check valves which open to permit the flow of fluid from the chambers into the outlet ports and when seated, prevent return flow therefrom, a common control means including a manually operable member for selectively operating said valves, means for directing fluid from a supply passage alternately through said supply ports to one valve chamber or the other, said common control means being movable to a first position opening both of said valves in one of said chambers permitting return flow from the outlet port associated with the one chamber and permitting closure of the first valve in the other chamber permitting the build up of pressure in said other chamber and the opening of the check valve therein so that fluid may flow to the outlet port associated with said other chamber, and movable to a second position opening both of said valves in said other chamber permitting return flow from the outlet port associated with said other chamber and permitting closure of the first valve in the one chamber permitting the build up of pressure in the one chamber and the opening of the check valve therein so that fluid may flow to the outlet port associated with the one chamber.

10. A reversing valve as defined in claim 9 wherein said common control means is movable to a third position opening both of said first valves and the check valve associated with said one chamber while permitting closure of the check valve associated with the other chamber so that fluid in the other outlet port is effectively locked, and movable to a fourth position opening both of said first valves and the check valve associated with said other chamber while permitting closure of the check valve associated with the one chamber so that fluid in the one outlet port is effectively locked.

11. A reversing valve having in combination, a casing having a pair of valve chambers, a pair of exhaust ports leading therefrom, a pair of fluid supply ports leading thereto, a pair of outlet ports leading therefrom, a first pair of valves in said valve chambers controlling the flow of fluid from the chambers into the exhaust ports, a pair of check valves which open to permit the flow of fluid from the chambers into the outlet ports and when seated, prevent return flow therefrom, a common control means including a manually operable member for selectively operating said valves, means for directing fluid from a supply passage alternately through said supply ports to one valve chamber or the other, said common control means being movable to a first position opening both valves in one of said chambers permitting return flow from the outlet port associated with the one chamber and permitting closure of the first valve in the other chamber permitting the build up of pressure in said other chamber and the opening of the check valve therein so that fluid may flow to the outlet port associated with said other chamber, and movable to a second position opening both of said valves in said other chamber permitting return flow from the outlet port associated with said other chamber and permitting closure of the first valve in the one chamber permitting the build up of pressure in the one chamber and the opening of the check valve therein so that fluid may flow to the outlet port associated with the one chamber, said common control being movable to a neutral central position opening said first valves and opening said second valves permitting free communication of said outlet ports and said supply passage with said exhaust ports, said common control member being movable to a third position opening both of said first valves and the check valve associated with said one chamber while permitting closure of the check valve associated with the other chamber so that fluid in the other outlet port is effectively locked, and movable to a fourth position opening both of said first valves and the check valve associated with said other chamber while permitting closure of the check valve associated with the one chamber so that fluid in the one outlet port is effectively locked.